(12) United States Patent
Stafford

(10) Patent No.: US 7,484,476 B2
(45) Date of Patent: Feb. 3, 2009

(54) LIVE WELL OXYGENATOR

(76) Inventor: H. Wayne Stafford, 558 Hwy. 468, Brandon, MS (US) 39042

( * ) Notice: Subject to any disclaimer, the term of this patent is extended or adjusted under 35 U.S.C. 154(b) by 91 days.

(21) Appl. No.: 10/764,445

(22) Filed: Jan. 27, 2004

(65) Prior Publication Data

US 2008/0010894 A1    Jan. 17, 2008

(51) Int. Cl.
*A91K 63/04* (2006.01)
(52) U.S. Cl. ............... 119/261; 43/57; 261/121.2
(58) Field of Classification Search .......... 119/261, 119/263; 261/94, 100, 121.2; 43/57, 55
See application file for complete search history.

(56) References Cited

U.S. PATENT DOCUMENTS

| | | | | |
|---|---|---|---|---|
| 3,640,516 A | * | 2/1972 | Willinger | ........... 261/121.2 |
| 3,815,277 A | | 6/1974 | Murray | |
| 3,904,393 A | * | 9/1975 | Morse | ........... 210/169 |
| 4,255,360 A | | 3/1981 | Jeffries | |
| 4,712,327 A | | 12/1987 | Ross, Sr. et al. | |
| 4,945,672 A | | 8/1990 | Raia | |
| 5,190,647 A | * | 3/1993 | Balestrieri | ........... 210/169 |
| 5,231,789 A | | 8/1993 | Radmanovich | |
| 5,582,777 A | * | 12/1996 | Vento | ........... 261/93 |
| 5,799,435 A | | 9/1998 | Stafford | |
| 5,822,916 A | | 10/1998 | Power | |
| 5,921,017 A | | 7/1999 | Clark et al. | |
| 6,394,423 B1 | * | 5/2002 | Vento | ........... 261/29 |
| 6,655,663 B2 | * | 12/2003 | Vento | ........... 261/29 |

FOREIGN PATENT DOCUMENTS

EP    0 359 965 A1    3/1990

* cited by examiner

*Primary Examiner*—Kurt Rowan
(74) *Attorney, Agent, or Firm*—Richard C. Litman

(57) ABSTRACT

A live well oxygenator includes a vessel having walls constructed of corrosion resistant material. The walls enclose a chamber that functions as a gaseous oxygen storage chamber. Fittings are disposed on the walls so that gaseous oxygen may be supplied to the chamber from an outside source. The vessel is equipped with a water pump and water return pipe which are in fluid communication with the water in a live well to provide for circulation of the water through the vessel. The water pump sucks water from the live well so that it flows through pump discharge piping. The pump discharge piping is positioned in the oxygen storage chamber. An induction fitting on the discharge piping functions to induct oxygen into the water stream in finely divided bubbles.

10 Claims, 5 Drawing Sheets

LIVE WELL OXYGENATOR

BACKGROUND OF THE INVENTION

1. Field of the Invention

The present invention generally relates to live well containers. More specifically, the present invention is drawn to apparatus for dissolving oxygen in a live well to maintain an adequate oxygen level required to sustain life of fish and other aquatic fauna.

2. Description of the Related Art

The storage, and/or transport of live fish and other live aquatic fauna and organisms require water containing an adequate amount of oxygen dissolved therein. The minimum amount of dissolved oxygen required to sustain life varies from species to species. It is known, however, that most species begin to experience stress at dissolved oxygen concentration below five (5) parts per million (ppm).

Usually, when transporting or storing live fish or the like, the population densities are greatly increased over natural population densities. If the organisms are to be maintained in prime physical condition, it is essential that the water in the storage container (live well) be sufficiently oxygenated to prevent stress or even death to the live organisms.

Maintaining appropriate oxygen concentrations in the water of the live well becomes an exercise of balancing the population of the organisms in the well, the volume of the live well and the rate of oxygen dissolved in the water. To date, the population of the organisms and the size of the live well have been limited by the rate of oxygen that could be dissolved. Varied solutions have been proposed to more efficiently accelerate this process. For example, U.S. Pat. No. 3,815,277 (Murray), U.S. Pat. No. 4,255,360 (Jeffries), U.S. Pat. No. 4,945,672 (Raia), U.S. Pat. No. 5,231,789 (Radmanovich) and U.S. Pat. No. 5,921,017 (Clark et al.) disclose systems that employ atmospheric air to aerate the water in live wells. These systems are limited because of the low concentration of oxygen that can be dissolved in water from atmospheric air.

U.S. Pat. No. 4,712,327 (Ross, Sr. et al.) is drawn to an aerated live well system that employs ice to cool the water in the live well. Although lowering temperature will enhance the ability of water to absorb oxygen, the enhanced ability is small when compared to the cost involved.

U.S. Pat. No. 5,822,916 (Power) is drawn to an electronically controlled live well having compartments for fish and bait. The well is provided with means to circulate the water through the compartments. There appears to be no other aeration apparatus.

U.S. Pat. No. 5,779,435 (Stafford) and European Patent numbered 0 359 965 A1 contemplate replenishing live well water with gaseous oxygen. The instant patents lack the high rate of oxygen solubility required for live wells of large volume.

None of the above inventions and patents, taken either singly or in combination, is seen to disclose a live well oxygenator system as will be subsequently described and claimed in the instant invention.

SUMMARY OF THE INVENTION

The live well oxygenator is a vessel having walls constructed of corrosion resistant material such as plastic, high-density polyethylene, polyvinyl chloride, etc. The walls enclose a chamber, which chamber functions as a gaseous oxygen storage chamber. Suitable fittings are disposed on the walls so that gaseous oxygen may be supplied to the chamber from an outside source. The vessel is equipped with a water pump and water return pipe which are in fluid communication with the water in a live well to provide for circulation of the water through the vessel. The water pump sucks water from the live well, which water flows through pump discharge piping. The pump discharge piping is positioned in the oxygen storage chamber. An induction fitting on the discharge piping functions to induct oxygen into the water stream in finely divided bubbles. The dispersion of oxygen into tiny bubbles greatly increases the water/oxygen contact area and accelerates the rate of solution of oxygen in the water. It is estimated that the system will dissolve up to 500 percent more oxygen than water in contact with atmospheric air.

The oxygenator vessel may be conveniently installed in most fishing boats as original equipment or may be retrofitted on most existing live wells. The vessel may be utilized as a stand alone live well, bait well, or fish transport vessel when integrally constructed with a suitable container or it may be installed as original equipment or retrofitted to aquatic organism transport tanks of any size on boats, airplanes, trucks, railway cars, etc.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
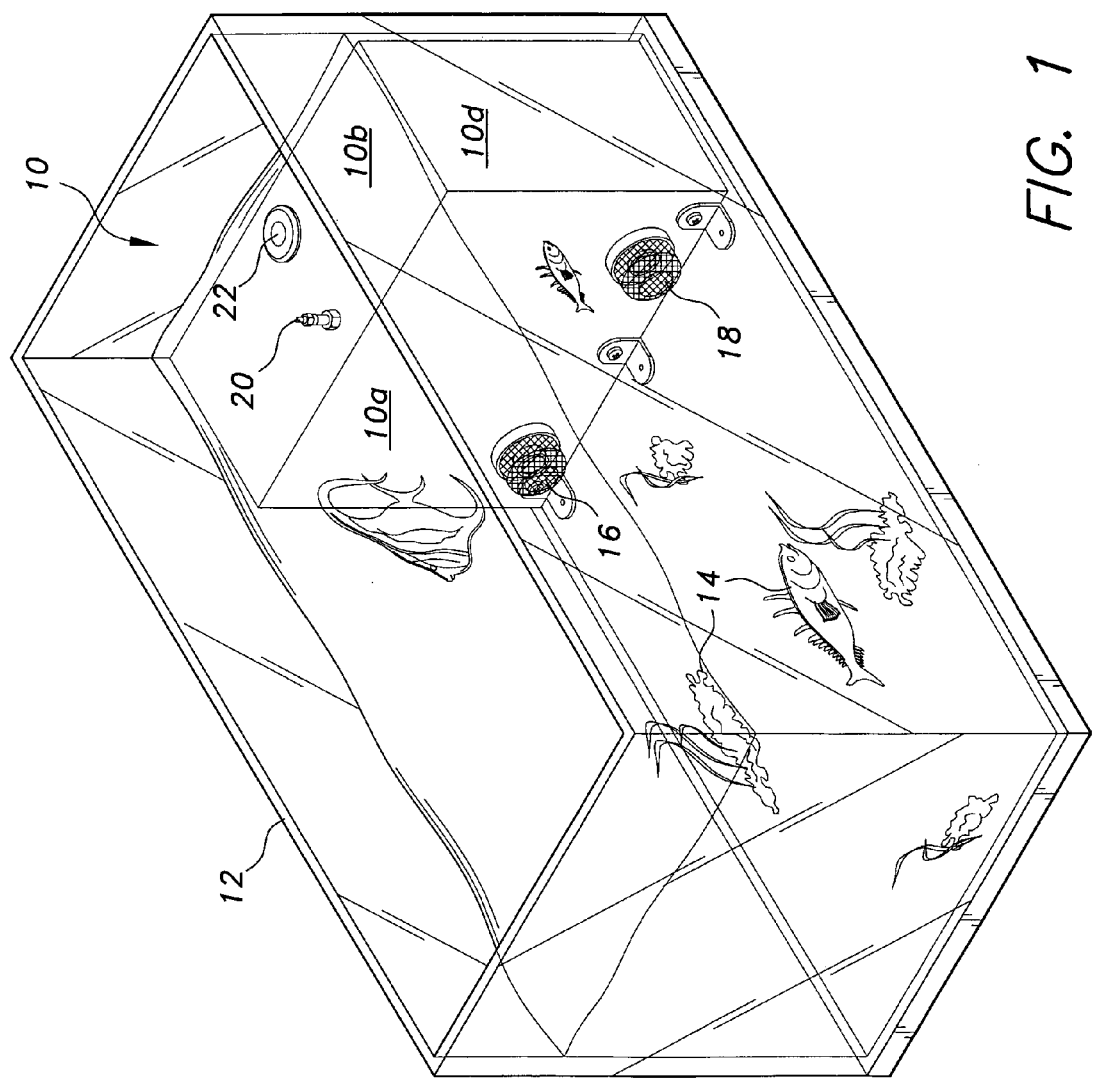
FIG. 1 is an environmental, perspective view of a live well oxygenator according to the present invention.
Figure 2:
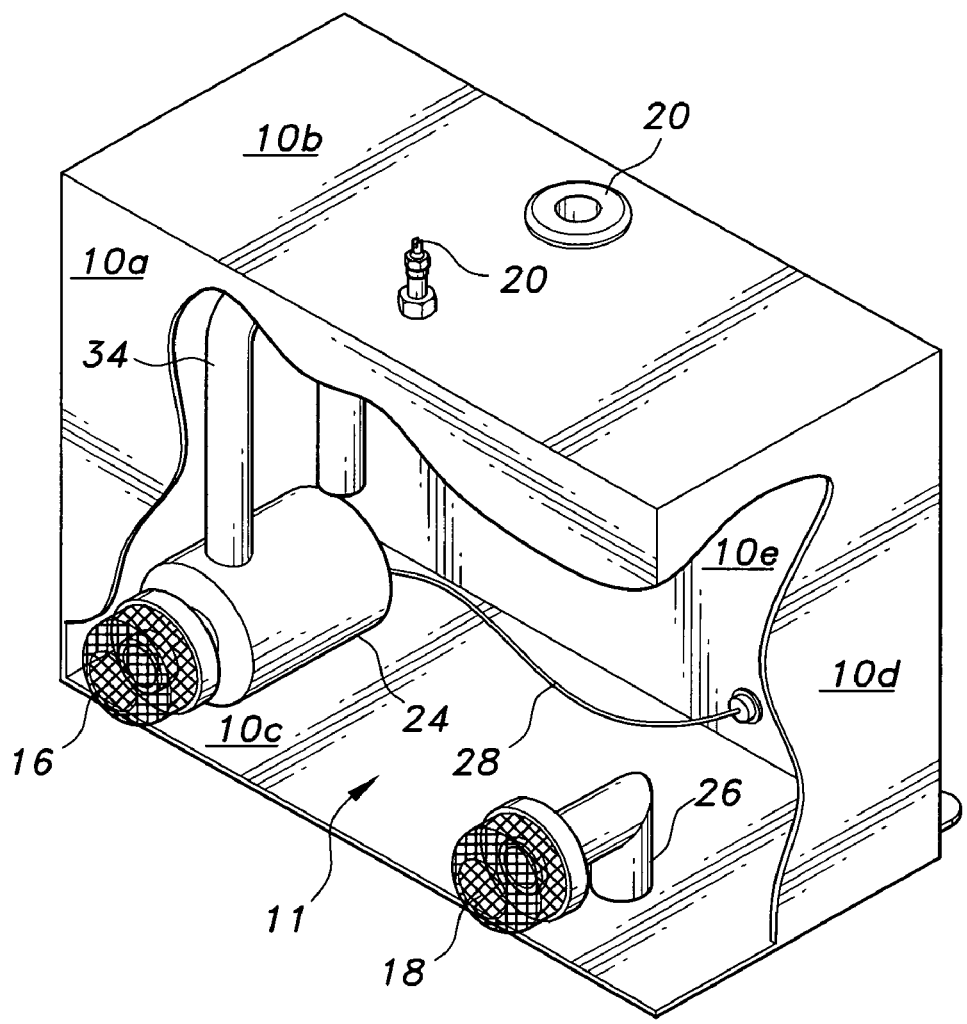
FIG. 2 is a perspective, cut-away view of a live well oxygenator according to the present invention.
Figure 3:
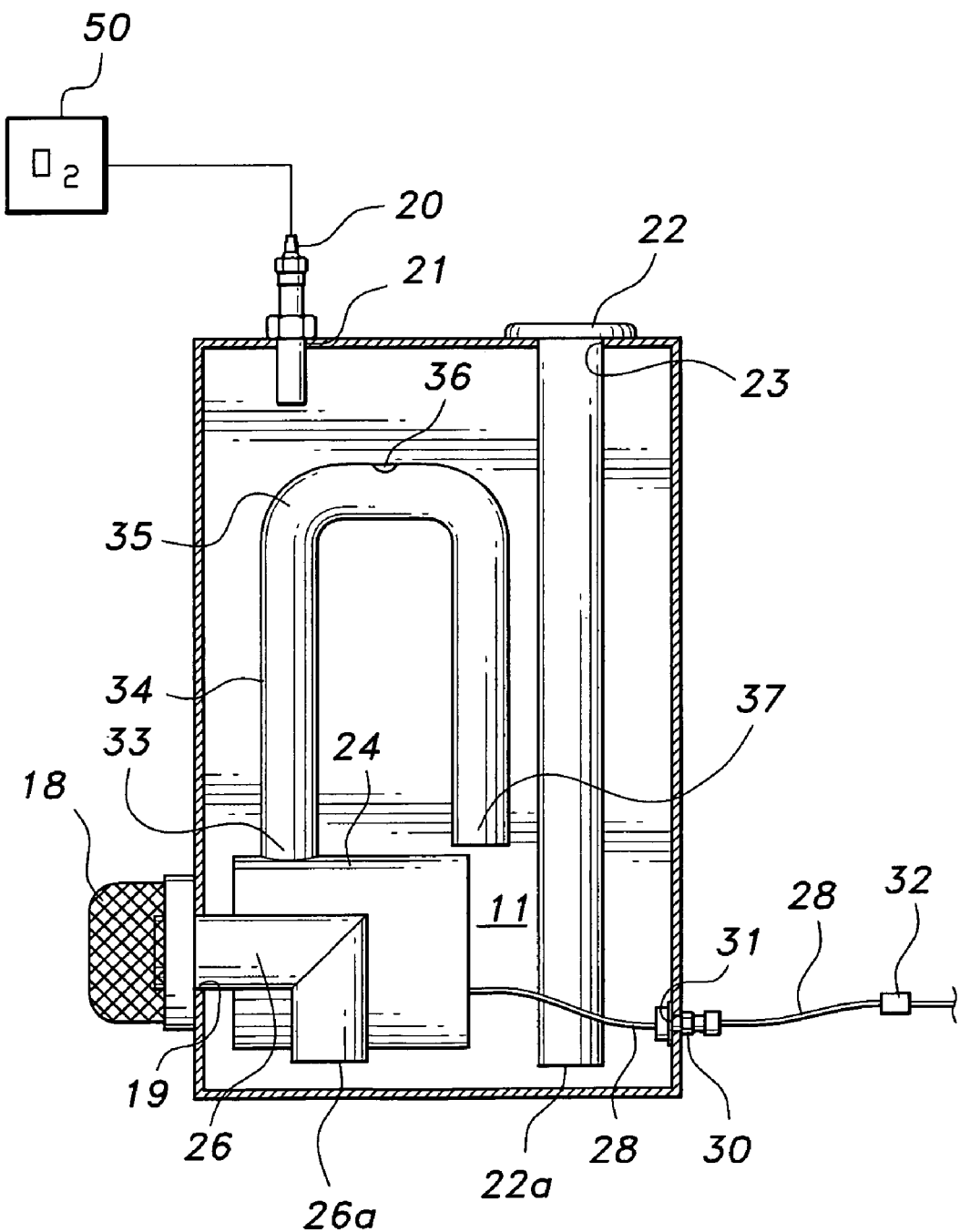
FIG. 3 is a side, cut-away view of a live well oxygenator according to the present invention.
Figure 4:
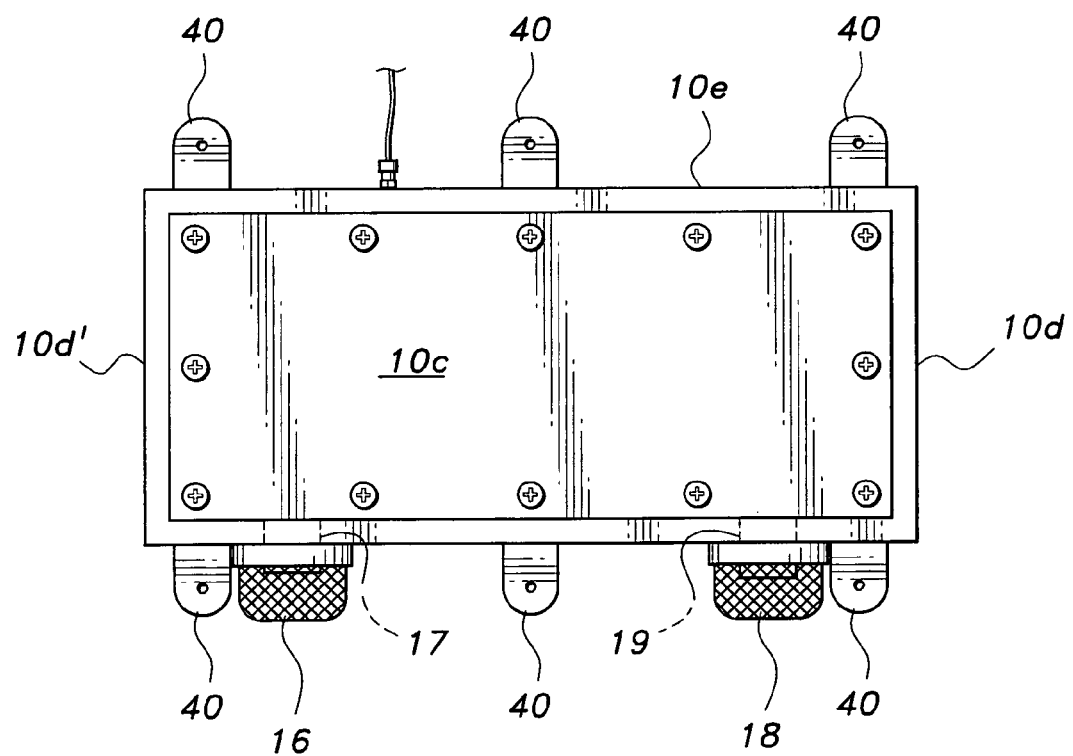
FIG. 4 is a bottom view of a live well oxygenator according to the present invention.

Attention is first directed to FIG. 1-4, wherein the oxygenator vessel of the present invention is generally indicated at 10. As illustrated, oxygenator vessel 10 has a front wall 10a, a top wall 10b, a rear wall 10e, a side wall 10d and 10d' and a bottom panel 10c that enclose an inner chamber 11. As best shown in FIGS. 3 and 4, the front wall includes a first opening 17 and a second opening 19. The top wall 10b includes a third opening 21 and a fourth opening 23, and the rear wall 10e includes a fifth opening 31. Vessel 10 is positioned in a live well tank 12. Tank 12 is filled with water W, which water supports live aquatic organisms 14. First filter screen 16 is positioned over the first opening 17 and second filter screen 18 is positioned over the second opening 19 in the front wall 10a of vessel 10, whose functions will be explained below. A bleed/feed valve 20 disposed through opening 21 and overflow/fill tube 22 disposed through opening 23 in the top wall 10b communicate with the inner chamber of vessel 10.

Figure 6:
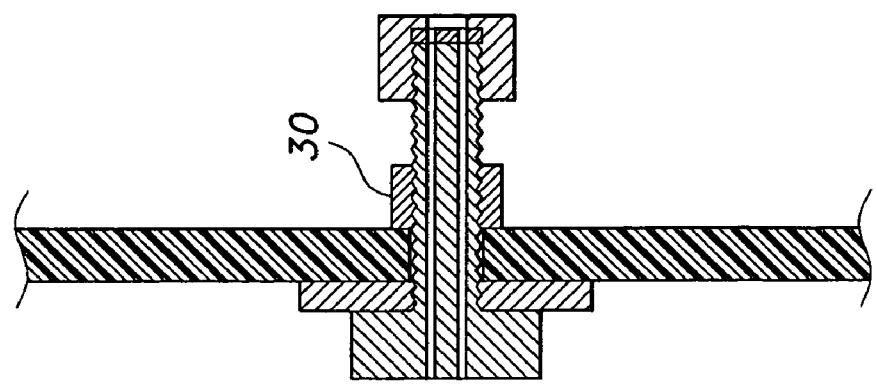
FIG. 6 is a sectioned view of an electric wire fitting utilized with a live well oxygenator according to the present invention.
Figure 5:
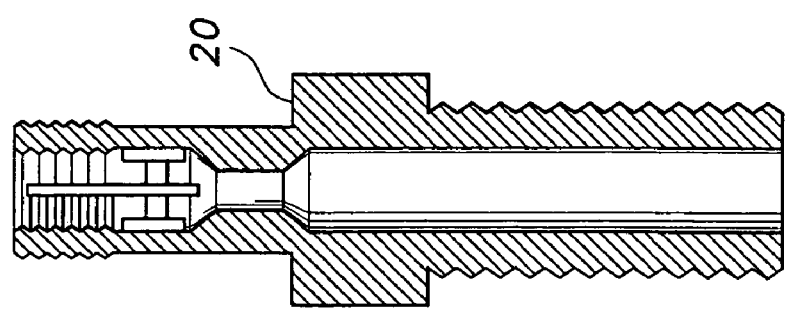
FIG. 5 is a sectioned view of a bleed/feed valve utilized with a live well oxygenator according to the present invention.

As best seen in FIGS. 2 and 3, the inner chamber of vessel 10 contains a water pump 24 and a L-shaped water return pipe 26 positioned near the bottom of the vessel and communicating through filter screen 16 and filter screen 18 with the interior of tank 12. The screens are fabricated from stainless steel and will prevent organisms from entering the pump and chamber 11. Water return pipe 26 has a lower end 26a opening into inner chamber 11. Tube 22 also has a lower end 22a opening into inner chamber 11. Ends 26a and 22a are spaced approximately the same distance from the bottom of the chamber. Filter screen 16 is disposed at the pump's entrance. Waterproof electric wires 28 are connected to pump 24 and extend through a watertight fitting 30 (FIG. 6), which fitting is disposed within the fifth opening 31 located in the rear wall 10e of vessel 10. Wires 28 are connected to an electric source (not shown) for providing electric power to the pump. A timer 32 may be interposed to provide a programmable timing function for the pump. Pump 24 has a U-shaped discharge pipe 34 connected thereto. The U-shaped discharge pipe 34 has one end 33 connected to pump 24, a bend section 35 disposed above the pump and an open end 37 extending toward the bottom of vessel 10. Venturi openings 36, whose functions are explained below, are disposed through the bend section pipe 34 at the top thereof.

FIG. 4 illustrates a bottom view of vessel 10 and shows a removal panel 10c whereby the inner volume of the vessel may be accessed for maintenance. It should be noted however, that panel 10c may be omitted if the vessel is placed inside of a tank. Tabs 40 are positioned around the perimeter of the vessel to enhance mounting where necessary.

In use, the vessel 10 is positioned in tank 12 or the like, which tank is filled with suitable water. Water rising in tank 12 will flow through return pipe 26 into the inner chamber defined by the walls of vessel 10 until the water reaches the lower end 26a of water return pipe 26. Atmospheric air, which is trapped in chamber 11 above lower end 26a, is removed via bleed/feed valve 20 while continuing to add water to tank 12. Chamber 11 is now filled with gaseous oxygen through valve 20 from a compressed oxygen tank 50. Alternatively, the oxygen may be fed through tube 22 with the use of suitable fittings. Compressed oxygen entering chamber 11 will cause water to be displaced and flow from chamber 11 through pipe 26 into tank 12. When the oxygen/water contact level is depressed to lower end 26a and/or lower end 22a, oxygen will escape from chamber 11 to avoid over pressurization. Bubbles will indicate that tank 11 is now full. There will remain a level of water in chamber 11 to lower end 26a and/or 22a.

Water pump 24 is connected via wires 28 to a 12-volt DC source (not shown) either directly or through timer 32. The pump sucks water from tank 12, and discharges it through pipe 34 into chamber 11. Oxygen is induced through openings 36 into the water flowing through pipe 34. The venturi effect of the openings results in oxygen being induced into the flowing water in finely divided bubbles. The dispersion of oxygen into tiny bubbles greatly increases the oxygen/water contact area and accelerates the rate of solution of oxygen in the water. The stream of water and oxygen bubbles flow from pipe 34 into the bottom of chamber 11 wherein oxygen solubility is further enhanced by contact between the 100% oxygen atmosphere and the water surface. Pressure increase in chamber 11 forces the water, now super-saturated with oxygen, to flow through return pipe 26 back into tank 12. No gaseous oxygen is lost in the return stream, because any bubbles of un-dissolved oxygen rise to the top of the water in chamber 11 and reenter the oxygen gas phase to be re-circulated until dissolved. Oxygen will be lost to the atmosphere from tank 12 by dissolution. For this reason water is circulated from chamber 11 to tank 12 only in such volumes as are necessary to maintain the desired oxygen levels. The volume of circulated water is controlled by controlling the run time of the water pump. This may be accomplished by utilizing timer 32 or by employing an oxygen feedback loop and relay (not shown) to only allow withdrawal of water from tank 12 at such times as additional oxygen is required. The practical size of chamber 11 contains enough oxygen for long periods of operation without refilling.

It is to be understood that the present invention is not limited to the embodiment described above, but encompasses any and all embodiments within the scope of the following claims.

I claim:

1. A live well oxygenator comprising:
    a vessel having an inner chamber enclosed by a front wall, a top wall, a rear wall, two side walls and a bottom panel, said front wall defining a first opening and a second opening therein, said top wall defining a third opening and a fourth opening therein, said rear wall defining a fifth opening therein;
    a water pump disposed within said vessel, said water pump having an inlet positioned at the first opening in the front wall;
    a U-shaped discharge pipe having one end connected to said water pump, a bend section disposed above said water pump and an open end extending towards the bottom panel of said vessel, the bend section of said discharge pipe defining at least one venturi opening therein;
    a L-shaped water return pipe disposed within said vessel, said water return pipe having one end positioned at the second opening in the front wall and an open end disposed proximate the bottom panel of said vessel;
    an oxygen feed valve disposed through the third opening in the top wall of said vessel; and
    an overflow tube having one end disposed through the fourth opening in the top wall of said vessel and terminating in an opposite end disposed proximate the bottom panel of said vessel.

2. The live well oxygenator according to claim 1, wherein the open end of said water return pipe and the opposite end of said overflow tube are spaced a substantially equal distance from the bottom panel of said vessel.

3. The live well oxygenator according to claim 1, further including a first filter screen and a second filter screen, each being respectively positioned over the first and second openings in the front wall of said vessel.

4. The live well oxygenator according to claim 1, wherein said oxygen feed valve is connected to a compressed oxygen source.

5. The live well oxygenator according to claim 1, further including electrical transmission wires connected to said water pump and extending through the fifth opening in the rear wall of said vessel.

6. The live well oxygenator according to claim 5, further including a timer interconnected to said electrical wires for providing a programmable timing function for said pump.

7. The live well oxygenator according to claim 5, wherein the fifth opening in the rear wall of said vessel includes a watertight fitting.

8. The live well oxygenator according to claim 1, wherein the bottom panel of the said vessel is removable to provide access to the inner chamber for maintenance.

9. The live well oxygenator according to claim 1, further including means for mounting said vessel within a tank.

10. The live well oxygenator according to claim 8, wherein said mounting means include an array of mounting tabs externally disposed on said vessel.

\* \* \* \* \*